Oct. 8, 1935.  H. W. OTIS  2,016,971
VISIBLE AUTOMOBILE REGISTRATION CARD AND KEY
Filed May 24, 1933
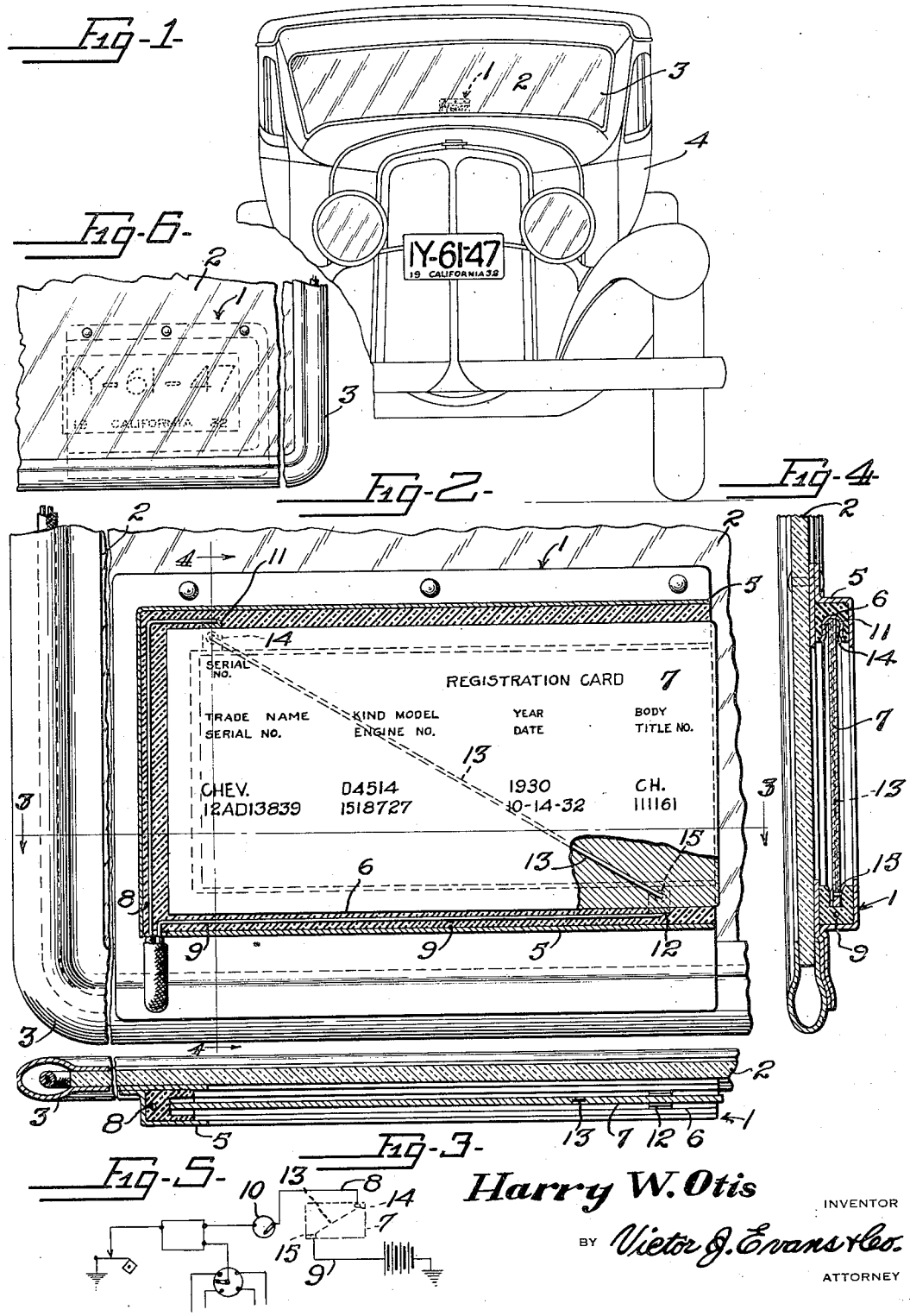
Harry W. Otis, INVENTOR
BY Victor J. Evans & Co.
ATTORNEY Patented Oct. 8, 1935

2,016,971

UNITED STATES PATENT OFFICE 2,016,971

VISIBLE AUTOMOBILE REGISTRATION CARD AND KEY

Harry W. Otis, South Pasadena, Calif.

Application May 24, 1933, Serial No. 672,712

1 Claim. (Cl. 40—2.2)

This invention relates to a visible automobile registration card and key and has for the primary object, the provision of a holder secured to an automobile which will be in view of persons in the vicinity of said automobile and is readily accessible to the driver to permit the latter to place in and remove therefrom a registration card so that display of said card may be had during the use of the automobile and may be removed when the automobile is left unattended. The card besides displaying data relative to the respective automobile, also provides an electrical control to the ignition system of the automobile, so that the latter cannot be started until the card has been installed in the holder, preventing unauthorized use of the automobile.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a fragmentary front elevation illustrating an automobile with a registration card and key applied thereto and constructed in accordance with my invention.

Figure 2 is a fragmentary vertical sectional view illustrating my invention mounted to the windshield of the automobile.

Figure 3 is a sectional view taken on the line 3—3 of Figure 2.

Figure 4 is a sectional view taken on the line 4—4 of Figure 2.

Figure 5 is a diagrammatical view illustrating the wiring diagram of the ignition system with my invention applied thereto.

Figure 6 is an enlarged fragmentary front elevation illustrating the windshield of the automobile with the holder and card thereon.

Referring in detail to the drawing, the numeral 1 indicates a holder suitably secured to the glass 2 of a windshield 3 of an automobile 4 and is preferably constructed to include a frame 5 having mounted therein guides 6 to slidably and removably receive a registration card 7. The frame may be of metallic construction while the guides 6 are of a suitable insulating material having embedded therein electrical conductors 8 and 9, one of the conductors being connected to the electrical source of the ignition system of the automobile, as shown in Figure 5, while the other conductor is connected to the usual ignition switch 10 of the automobile. The conductor 8 terminates in a terminal 11 located in the upper guide of the frame while the conductor 9 terminates in a terminal 12 located in the lower guide of the frame. The card 7 besides having data printed or otherwise applied thereto has embedded therein a conductor 13 connected to terminals 14 and 15 adapted to contact with the terminals 11 and 12, respectively, when the card is positioned within the holder to complete the electric circuit between the switch 10 and the electrical source of the ignition system.

The data on the card 7 may set forth information relative to the character or make of the automobile as well as giving the number and State of the license tag of the automobile. It is preferable that the card be of a suitable insulating material and also weather proof and may be colored to correspond with the color of the license plate of the respective automobile. The card when mounted in the holder is viewable from the interior and exterior of the automobile.

During the use of the automobile the card must be positioned in the holder in order that the ignition system of the automobile be operative and when the automobile is left unattended, the operator or driver removes the card and keeps the same in his possession. The police authorities with this invention in use upon automobiles may readily determine or check if the automobiles are being operated by authorized persons. This device also maintains the card in clear view, obviating the necessity of the operator of the vehicle from searching through the compartments of the automobile for the card when requested to display the card by police officials. The automobile when operated with a card not bearing the proper data relative to the respective automobile and not giving corresponding data of the license plates of the automobile, the police authorities will then be unmistakably advised of the use of the automobile by an unauthorized person.

While I have shown and described the preferred embodiment of my invention, it will be understood that minor changes in construction, combination and arrangement of parts may be made without departing from the spirit and scope of my invention, as claimed.

Having described the invention, I claim:

A device of the character set forth comprising a substantially rectangular-shaped frame secured to a windshield of an automobile and having one end open, insulating guides carried by opposite sides and one end of the frame, electrical terminals carried by opposite guides and one terminal being located adjacent the closed end of the frame and the other terminal being located adjacent the open end of the frame, means for connecting the terminals to an ignition system of an automobile to break said ignition system, a card slidably and removably received by the guides from the open end of the frame and viewable from opposite sides of said frame, and an electrical conductor embedded in and arranged diagonally of the card and having its ends exposed at the opposite edges of the card to engage the terminals for closing the ignition system.

HARRY W. OTIS.